United States Patent [19]
Hablützel

[11] Patent Number: 6,160,221
[45] Date of Patent: Dec. 12, 2000

[54] SCREWED CABLE GLAND FOR A SHIELDED CABLE

[75] Inventor: Richard Hablützel, Birmensdorf, Switzerland

[73] Assignee: Agro AG, Hunzenschwil, Switzerland

[21] Appl. No.: 09/152,239

[22] Filed: Sep. 11, 1998

[30] Foreign Application Priority Data

Sep. 16, 1997 [EP] European Pat. Off. .............. 97116041

[51] Int. Cl.[7] .................................................. H02G 15/06
[52] U.S. Cl. ..................................... 174/88 C; 174/65 SS
[58] Field of Search ..................... 174/78, 88 C, 174/88 S, 65 R, 65 SS, 84 R; 439/98

[56] References Cited

U.S. PATENT DOCUMENTS

| | | | |
|---|---|---|---|
| 2,173,643 | 9/1939 | Moser | 174/88 C X |
| 2,671,127 | 3/1954 | Hope | 174/88 C |
| 3,567,843 | 3/1971 | Collins | 174/78 X |
| 3,603,912 | 9/1971 | Kelly | 174/65 SS |
| 3,739,076 | 6/1973 | Schwartz | 174/78 |
| 4,022,966 | 5/1977 | Gajajiva | 174/65 SS |
| 5,432,301 | 7/1995 | Gehring | 174/78 |

FOREIGN PATENT DOCUMENTS

| | | |
|---|---|---|
| 0 515 200 A1 | 11/1992 | European Pat. Off. . |
| 0 778 644 A2 | 6/1997 | European Pat. Off. . |
| 2 371 077 | 6/1978 | France . |
| 2 438 929 | 5/1980 | France . |
| 33 22 476 A1 | 12/1983 | Germany . |
| 3460/95 | 12/1995 | Switzerland . |

*Primary Examiner*—Kristine Kincaid
*Assistant Examiner*—Chau N. Nguyen
*Attorney, Agent, or Firm*—Collen Law Associates, P.C.

[57] ABSTRACT

The screwed cable gland has at least one lower part, a pressing part, and a union nut, which are each traversed by a respective hole and are to be pushed over the cable. The lower part can be connected to a housing in an electrically conducting manner and can be axially tensioned with the union nut. The pressing part and the sealing insert form one unit, wherein the sealing insert is arranged in the union nut and reduces the cross section of its hole with increasing axial tension between the lower part and the union nut. The screwed cable gland is characterized by inexpensive manufacture and simple assembly.

8 Claims, 1 Drawing Sheet

SCREWED CABLE GLAND FOR A SHIELDED CABLE

FIELD OF THE INVENTION

The present invention pertains to a screwed cable gland.

BACKGROUND OF THE INVENTION

A cable gland of a similar type is manufactured and used by the applicant and is described in Swiss Patent Application No. 3460/75 of Dec. 7, 1995. The pressing part in the screwed cable gland is designed as an annular sleeve, which has a cylindrical hole and a conical jacket surface. Incisions are made in the annular sleeve alternating from the front side and the rear side. The layout of this annular sleeve has a zigzag-like meandering shape. Based on this special design, the annular sleeve can taper uniformly over its entire length under the axial pressure of an additional intermediate piece which can be screwed in between the lower part and the union nut and be in contact with the tube-like shielding braiding with a uniform pressure distribution. The use of this screwed cable gland is intended for devices in which very high requirements are imposed on the reliability of function. To ensure that the screwed cable gland is water-tight, the intermediate piece has a threaded collar, into which a sealing insert is pushed, which can be axially upset with a union nut which can be screwed onto the threaded collar. This screwed cable gland consequently comprises many individual parts.

Screwed cable glands in which the exposed shielding braiding is clamped between two disks or conical parts have also become known in the prior art. These screwed cable glands also comprise many individual parts and their assembly is comparatively complicated.

SUMMARY AND OBJECTS OF THE INVENTION

The basic object of the present invention is to provide a screwed cable gland of the above-mentioned type which can be manufactured at a low cost, can be assembled in a short time and is nevertheless reliable in operation.

This object is accomplished in a screwed cable gland of this class by the pressing part and the sealing insert forming one unit, wherein the sealing insert is arranged in the union nut and it reduces the cross section of its hole with increasing axial tension between the lower part and the union nut. A separate intermediate piece is not needed here. Since the sealing insert and the pressing part form one unit, these can be mounted together. This substantially simplifies the assembly and also reduces the number of individual parts. A unit means here that the sealing insert and the pressing part are accommodated together and they cooperate. These two parts are preferably rigidly connected to one another. However, they may also be located loosely next to one another. Due to this unit transmitting the axial pressure onto a corresponding conical surface in the lower part, the end of the shielding braiding located between them is securely clamped.

It is also essential that the axial length of the screwed cable gland according to the present invention may be substantially shorter than a screwed cable gland according to the above-mentioned state of the art.

If, according to a variant of the present invention, the pressing part is injection-molded integrally with the sealing insert, an especially inexpensive manufacture and simple handling are guaranteed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF PREFERRED EMBODIMENTS

Figure 1:
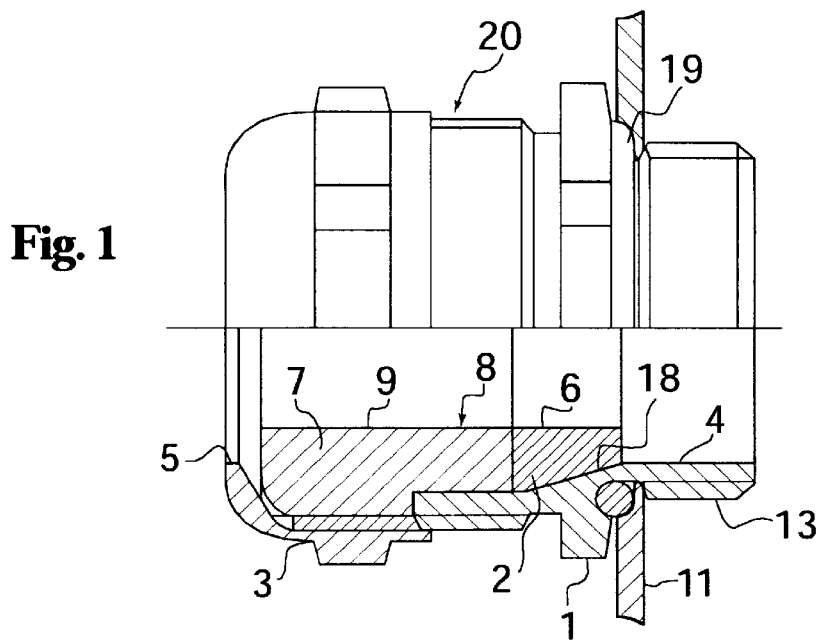
FIG. 1 shows a partial longitudinal section through a screwed cable gland according to the present invention.
Figure 2:
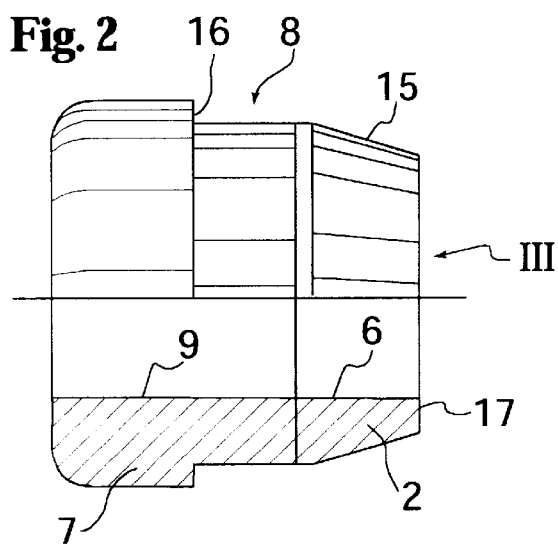
FIG. 2 shows a partial cross section of the unit.

The screwed cable gland 20 shown in FIG. 1 has a lower part 1 and a union nut 3, which are preferably made of a conductive metal and are screwed to one another. A unit 8, which comprises a pressing part 2 as well as a sealing insert 7, is located inside the screwed cable gland 20. The screwed cable gland 20 is used to introduce an electric cable 10 (FIG. 4) into a grounded housing 11.

Figure 4:
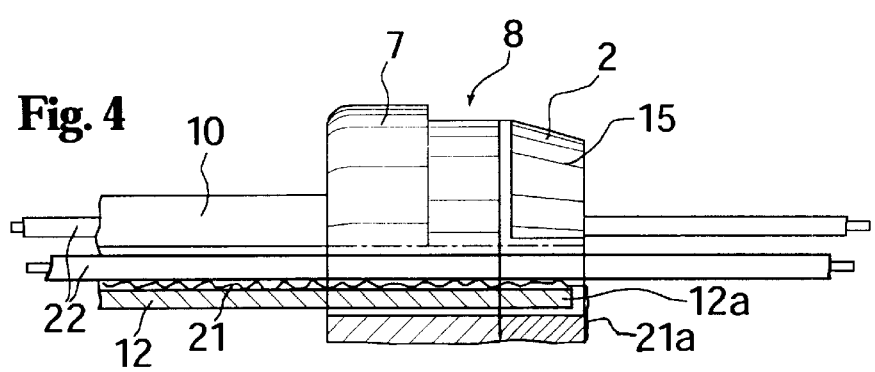
FIG. 4 shows a partial cross section of a unit according to FIG. 2 with the cable mounted.

As is shown in FIG. 4, the cable 10 has a flexible protective jacket 12, which surrounds a tube-like shielding braiding 21. The protective jacket 12 is stripped at its front end such that a front end 21a of the shielding braiding 21 projects from the protective jacket 12 over a front cut surface 12a. There are electric conductors 22 inside the shielding braiding 21.

Figure 3:
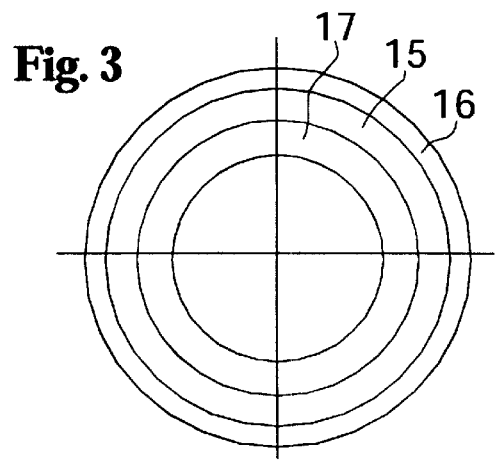
FIG. 3 shows a view of the unit according to FIG. 2.

To fasten the screwed cable gland 20 to the housing 11, which is shown only schematically here, the lower part has an adapter nipple 13, which can be screwed directly into a threaded hole. In the case of a thin-walled housing with a through hole, as in the case shown here, a nut, not shown here, is to be additionally screwed onto the adapter nipple. A sealing ring 19 is used to seal the lower part 1 against the housing 11. The lower part 1 has a passage 4, which has a conical section 18, with which a corresponding conical outside 15 of the pressing part 2 is brought into contact. The stripped end 21a of the shielding braiding 21 is clamped between the two conical surfaces 18 and 15. The clamping force needed for this is built up during the screwing on of the union nut 3 onto the lower part 1. The sealing insert 7, which is preferably made of a rubber-elastic plastic, is now upset in the axial direction and thus tensioned radially and axially. An inner surface 9 comes into contact on the outside with the shielding braiding 12 due to the upsetting, sealing it watertightly to the outside as a result. In addition, the pressing part 2 is pressed onto the conical surface 18 due to the tension of the sealing insert 7. According to FIG. 3, the sealing insert 7 may be of a regular cylindrical shape providing a round cross-section. This also applies to the pressing part 2. However, the pressing part may also be, e.g., elliptical or polygonal. As is shown in FIG. 1, the sealing insert 7 has a shoulder 16, with which the inner end of the lower part 1 is in contact.

The pressing part 2 consists of a preferably hard plastic or metal. It is detachably or nondetachably connected to the sealing insert 7. In a preferred embodiment, the pressing part is made in one piece with the sealing insert, in particular the pressing part is made of a plastic and is integrally injection-molded with the sealing insert 7. An inner hole 6 is flush with an inner hole 9 of the sealing insert 7. The sizes of the holes 6 and 9 depend on the external diameter of the cable 10.

As was mentioned above, the cable 10 is stripped during the assembly of the screwed cable gland 20 and the unit 8 is pushed over the cable 10. The free end 21*a* of the shielding braiding 21 is folded over a front end face 17 of the pressing part according to FIG. 4 and is brought into contact with at least one partial area of the conical surface 15. The unit 8 is now inserted into the lower part 11 mounted beforehand on the housing 11 and the union nut 3 is screwed together with the lower part 1. As was mentioned above, the unit 8 is upset during the screwing together and the end 21*a* is clamped and the cable 10 is sealed. The assembly process is thus comparatively rapid and simple. No special tools are needed.

While specific embodiments of the invention have been shown and described in detail to illustrate the application of the principles of the invention, it will be understood that the invention may be embodied otherwise without departing from such principles.

What is claimed is:

1. Screwed cable gland for a shielded cable, which has at least one lower part, a pressing part and a union nut, which are traversed each by a respective hole and are to be pushed over said cable, wherein said lower part can be connected to a housing in an electrically conducting manner and can be axially tensioned with said union nut, and wherein said pressing part presses a conical outside against a conical section of said lower part with increasing axial tension between said lower part and said union nut and thus clamps a free end of a shielding braiding folded around a front end face in a contacting manner, and with a sealing insert, which is to be brought into contact with a protective jacket of said cable in order to protect the inside of said screwed cable gland against the penetration of water, wherein said pressing part and said sealing insert form one unit, wherein said sealing insert is arranged in said union nut and reduces the cross section of said hole with increasing axial tension between said lower part and said union nut and said sealing insert engages said union nut with one end and said lower part with the other end.

2. Screwed gland in accordance with claim 1, wherein said pressing part is made in one piece with said sealing insert.

3. Screwed gland in accordance with claim 2, wherein said sealing insert has a shoulder on its circumference, and said shoulder is in contact with said lower part.

4. Screwed gland in accordance with claim 1, wherein said pressing part is integrally injection-molded with said sealing insert.

5. Screwed gland in accordance with claim 3, wherein said sealing insert has a shoulder on its circumference, and said shoulder is in contact with said lower part.

6. Screwed gland in accordance with claim 1, wherein said sealing insert is made of a rubber-elastic material and said pressing part is made of another, substantially harder, material.

7. Screwed gland in accordance with claim 1, wherein said pressing part has a round cross-section.

8. Screwed gland in accordance with claim 1, wherein said sealing insert has a shoulder on its circumference, and said shoulder is in contact with said lower part.

\* \* \* \* \*